(12) United States Patent
Uematsu

(10) Patent No.: US 9,118,820 B2
(45) Date of Patent: Aug. 25, 2015

(54) WRITING CONTROL DEVICE AND IMAGE FORMING APPARATUS

(71) Applicant: Konica Minolta, Inc., Tokyo (JP)

(72) Inventor: Daisuke Uematsu, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/151,352

(22) Filed: Jan. 9, 2014

(65) Prior Publication Data

US 2014/0211261 A1    Jul. 31, 2014

(30) Foreign Application Priority Data

Jan. 29, 2013   (JP) .................................. 2013-014839

(51) Int. Cl.
| G06F 15/00 | (2006.01) |
| G06K 1/00 | (2006.01) |
| G06K 15/00 | (2006.01) |
| H04N 1/21 | (2006.01) |
| G06F 3/06 | (2006.01) |
| G11B 5/012 | (2006.01) |

(52) U.S. Cl.
CPC .............. *H04N 1/2166* (2013.01); *G06F 3/064* (2013.01); *G06F 3/0613* (2013.01); *G06F 3/0689* (2013.01); *G11B 5/012* (2013.01); *G06F 3/0644* (2013.01)

(58) Field of Classification Search
CPC ..... H04N 1/2166; G06F 3/0613; G06F 3/064; G06F 3/0644; G06F 3/0689; G11B 5/012
USPC ......................................... 358/1.1, 1.16, 1.15
See application file for complete search history.

(56) References Cited

U.S. PATENT DOCUMENTS 7,076,607 B2 *   7/2006   Miwa et al. .................... 711/114
2012/0268757 A1 *  10/2012   Honma .......................... 358/1.9

FOREIGN PATENT DOCUMENTS

| JP | 10-143997 A | 5/1998 |
| JP | 2008286756 A | 11/2008 |
| JP | 2012-003591 A | 1/2012 |

OTHER PUBLICATIONS

Notice of Reason for Refusal issued in corresponding Japanese Application No. 2013-014839 mailed Jan. 21, 2015 (9 pages).

* cited by examiner

*Primary Examiner* — Douglas Tran
(74) *Attorney, Agent, or Firm* — Osha Liang LLP

(57) ABSTRACT

Disclosed is a writing control device including: a storing unit comprising N HDDs, N being an integer which is 2 or more; a data division unit configured to divide data to be written in the storing unit into N unequal division data; and a writing control unit configured to dispersedly store the N division data in the N HDDs in parallel, wherein the N division data include a first division data and a second division data having a larger data size than the first division data, and the writing control unit writes the second division data in tracks of a portion of the HDD, which is positioned on an outer side than a portion in which the first division data is written.

7 Claims, 11 Drawing Sheets

FIG. 7
DATA TO BE WRITTEN
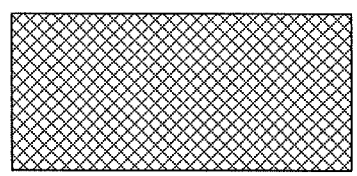
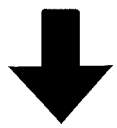
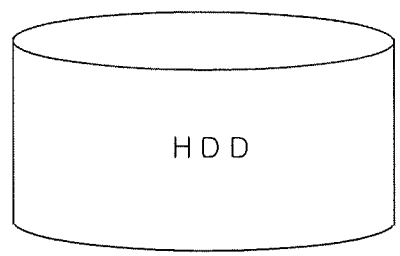
WRITE DATA IN PLATTER
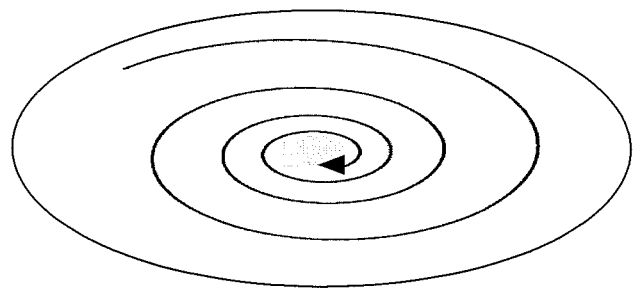

WRITING CONTROL DEVICE AND IMAGE FORMING APPARATUS

BACKGROUND OF THE INVENTION

1. Field of the Invention

The present invention relates to a writing control device and an image forming apparatus, for dispersedly storing data in a plurality of HDDs.

2. Description of Related Art

Conventionally, in an image forming apparatus, an HDD (Hard Disk Drive) is used as a medium for storing a large-volume data, such as an image data. The HDD is configured so as to contain a disk for storing data in a casing. In the HDD, by rotating the disk and seeking a specific sector with a head, a data is written or read.

In many cases, the data are written in order from the tracks of the outer peripheral portion toward the tracks of the inner peripheral portion on the disk (platter). FIG. 7 shows the situation in which the data are written in one HDD in order from the tracks of the outer peripheral portion toward the tracks of the inner peripheral portion. In the HDD, the outer peripheral portion is different from the inner peripheral portion in the size of data which is written or read during one rotation of the disk. As the tracking proceeds to the inner side, the data transfer speed is low (the performance of the HDD is deteriorated).

For example, the graph 90 of FIG. 8 shows the relation between the position (track) on which the data is written in or read from the HDD, and the data transfer speed. In the graph 90, the abscissa axis indicates the track and the ordinate axis indicates the data transfer speed. As the position (track) on which the data is written or read proceeds to the inner side, the data transfer speed becomes low.

The graph 91 of FIG. 9 corresponds to the graph 90 of FIG. 8, and shows the relation between the position (track) on which the data is written in or read from the HDD, and the time which is necessary to transfer the data having the predetermined size. In the graph 91, the abscissa axis indicates the track and the ordinate axis indicates the time which is necessary to transfer the data. The time which is necessary to transfer the data can be calculated by dividing the size of data to be written or read by the data transfer speed. Because the data transfer speed becomes low as the position (track) on which the data is written or read proceeds to the inner side, the time which is necessary to transfer the data is increased.

In Japanese Patent Application Publication No. 2008-286756, the following technology is disclosed. In the technology, in order to close the difference in the performance (data transfer speed) between the outer peripheral portion and the inner peripheral portion, when the data is stored, the highly-compressed data is written in the outer peripheral portion in which the data is written or read at a high speed, and the low-compressed data is written in the inner peripheral portion in which the data is written or read at a low speed (the compression ratio of the data to be written is changed depending on the outer peripheral portion or the inner peripheral portion). As a result, the time which is necessary to expand the read data becomes constant.

The data transfer speed of one HDD has an upper limit. Therefore, there are some cases in which the performance which is necessary for an image forming apparatus, cannot be obtained by the data transfer speed of one HDD.

For example, in FIG. 8, even the data transfer speed in the track of the outermost periphery is less than the speed which is necessary for an image forming apparatus to maintain the productivity (hereinafter, referred to as "productivity maintaining speed"). Further, in FIG. 9, even in the track of the outermost periphery, the time which is necessary to transfer the data is more than the time limit for satisfying the productivity in the image forming apparatus. That is, the performance which is necessary for the image forming apparatus to maintain the productivity is not obtained.

As a method for increasing the data transfer speed, a method for storing data by using the RAID (Redundant Arrays of Inexpensive Disks) structure in which a plurality of HDDs are provided (RAID 0 (striping)), has been proposed. In the striping, the data to be stored is equally divided into the number of HDDs, and is dispersedly stored. When the data is written by the striping in a plurality of HDDs which constitute the RAID, the division data into which the data is divided are stored in the tracks (sector) having the identical address, respectively.

FIG. 10 shows the situation in which the data is dispersedly stored by the striping in three HDDs. Also, when the striping is carried out, the division data are written in order from the tracks of the outer peripheral portion toward the tracks of the inner peripheral portion. However, in the RAID 0 (striping), the data transfer speed of the whole RAID 0 is calculated by multiplying the lowest data transfer speed among a plurality of HDDs which are activated in parallel, by the number of HDDs. Therefore, when the data transfer speed of only one HDD is decreased, the data transfer speed of the whole RAID 0 is largely decreased with decreasing the data transfer speed of the HDD. In case that the data is written in or read from the outer peripheral portion of the disk, the desired data transfer speed is achieved. On the other hand, in case that the data is written in or read from the inner peripheral portion of the disk, the desired data transfer speed could not be achieved.

The graph 92 of FIG. 11 shows the relation between the position (track) on which the data is written in or read from the HDD, and the time which is necessary to transfer the data, in case that the striping is carried out by using three HDDs. In the graph 92, the abscissa axis indicates the track and the ordinate axis indicates the time which is necessary to transfer the data. In FIG. 11, the time which is necessary to transfer the data in case that each of the above three HDDs is used alone, is the same as the time shown in the graph 91 of FIG. 9.

In the graph 92 of FIG. 11, like the graph 91 of FIG. 9, as the position (track) on which the data is written or read proceeds to the inner side, the time which is necessary to transfer the data is increased. However, because the data is equally divided into three division data and the division data are written in or read from three HDDs in parallel, the data transfer speed of the whole RAID is high. As compared with the graph 91 of FIG. 9, the time which is necessary to transfer the data is short.

In the graph 92, from the track of the outermost periphery to the track of T1, the time which is necessary to transfer the data is not more than the time limit for satisfying the productivity in the image forming apparatus. As a result, the performance which is necessary for the image forming apparatus to maintain the productivity is obtained (the data transfer speed of the whole RAID is not less than the productivity maintaining speed).

However, in the tracks of the inner peripheral portion which is an inner portion from the track of T1, even though the striping is carried out, the time which is necessary to transfer the data is over the time limit for satisfying the productivity in the image forming apparatus (the data transfer speed of the whole RAID is less than the productivity maintaining speed). The performance which is necessary for the image forming apparatus to maintain the productivity is not obtained. Therefore, in a conventional technology, the tracks of the inner peripheral portion which is an inner portion from the track of T1 in the HDD, is set to the write inhibit area, and the data is written in or read from only the tracks of the outer peripheral portion which is an outer portion from the track of T1. As a result, the desired data transfer speed is secured and the performance which is necessary for the image forming apparatus to maintain the productivity is achieved. However, when the HDD is used as described above, the problem in which the inner peripheral portion of the HDD is not used is caused.

By increasing the HDDs which constitute the RAID, it is possible to reduce the write inhibit area. However, the cost and the space of the HDDs to be increased are required.

In the method disclosed in Japanese Patent Application Publication No. 2008-286756, in case that the data is stored in one HDD, the compression ratio of the data is changed depending on the position to which the data is written. The disclosed method is not available for the case in which a plurality of HDDs are used or the case in which the data is divided.

SUMMARY

To achieve at least one of the abovementioned objects, a writing control device reflecting one aspect of the present invention comprises:

a storing unit comprising N HDDs, N being an integer which is 2 or more;

a data division unit configured to divide data to be written in the storing unit into N unequal division data; and a writing control unit configured to dispersedly store the N division data in the N HDDs in parallel, wherein the N division data include a first division data and a second division data having a larger data size than the first division data, and the writing control unit writes the second division data in tracks of a portion of the HDD, which is positioned on an outer side than a portion in which the first division data is written.

Preferably, the writing control unit switches between the HDD in which the first division data is written and the HDD in which the second division data is written.

Preferably, a storing area of each HDD is sectionalized into a plurality of areas along a circumferential direction of the storing area, and the writing control unit writes the second division data in the tracks of the area which is positioned on an outer side than the area in which the first division data is written.

Preferably, the data division unit divides the data so that a data size of each division data does not exceed a value obtained by multiplying a data transfer speed in tracks in which the division data is written, by a predetermined time.

Preferably, the data division unit divides the data in a ratio of each data size of the N division data, which is determined so as to be coincident with a ratio of a data transfer speed in tracks in which each division data is written.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIG. 7 is an explanatory view showing the situation in which the data is written in one HDD;

DETAILED DESCRIPTION OF PREFERRED EMBODIMENTS

Hereinafter, a preferred embodiment of the present invention will be explained with reference to the accompanying drawings.

Figure 1:
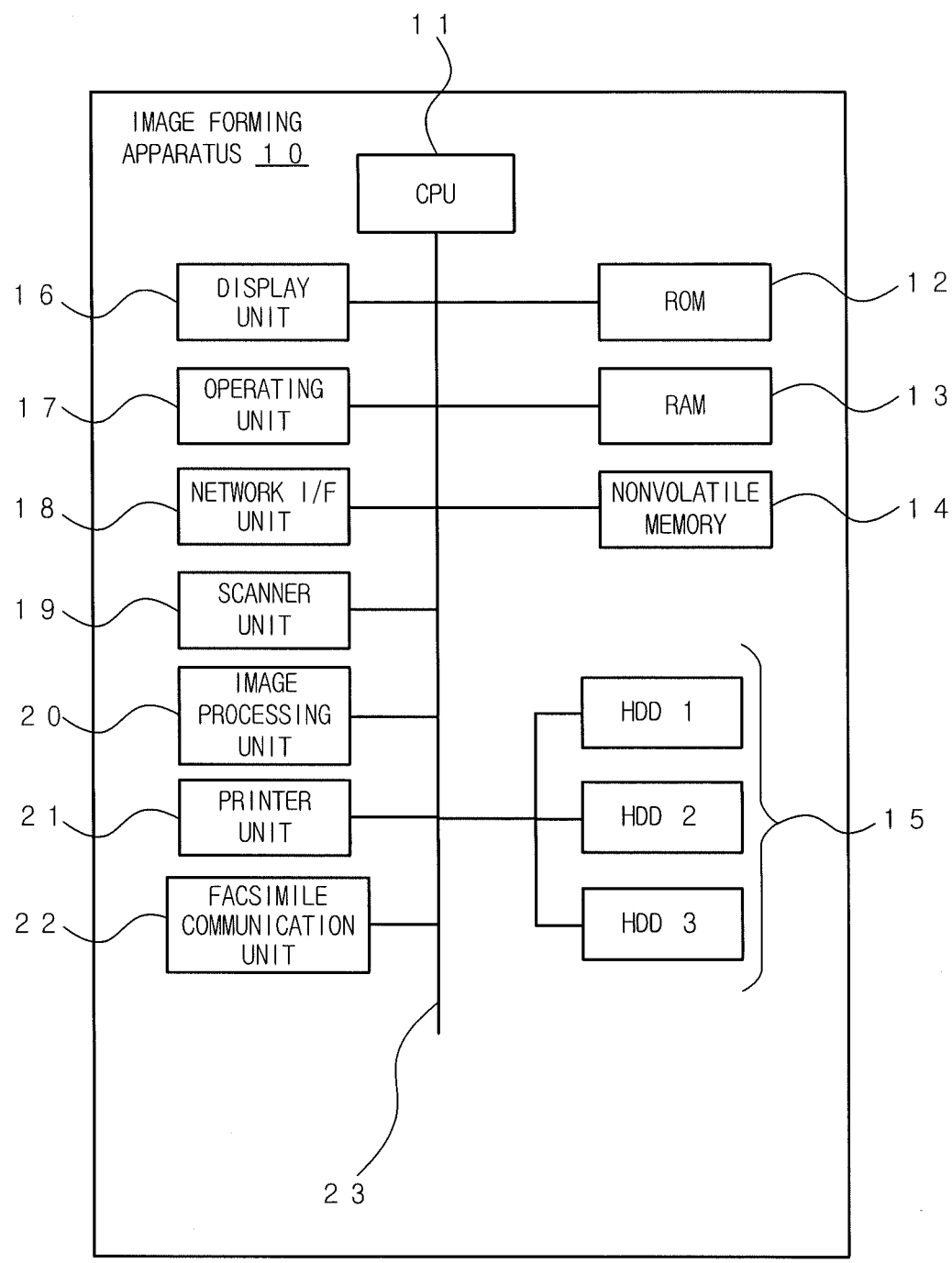
FIG. 1 is a block diagram showing the schematic configuration of the image forming apparatus according to the embodiment.

FIG. 1 shows the schematic configuration of the image forming apparatus 10 according to the embodiment. The image forming apparatus 10 comprises a CPU (Central Processing Unit) 11 for controlling the operation of the image forming apparatus 10, a ROM (Read Only Memory) 12, a RAM (Random Access Memory) 13, a nonvolatile memory 14, a storing unit 15 having three HDDs, a display unit 16, an operating unit 17, a network I/F unit 18, a scanner unit 19, an image processing unit 20, a printer unit 21 and a facsimile communication unit 22 which are connected with the CPU 11 via a bus 23.

By the CPU 11, a middleware, application programs and the like are executed on an OS (Operating System) program as a base. Further, the CPU 11 divides the data to be written in the storing unit 15 into two or more (in this embodiment, three) unequal division data, as the data division unit. Further, the CPU 11 dispersedly stores the three division data in three HDDs in parallel, as the writing control unit. In the ROM 12, various types of programs are stored. By executing various types of processes by the CPU 11 in accordance with these programs, various types of functions of the image forming apparatus 10, such as the execution of a job, are realized. The RAM 13 is used as a work memory for temporarily storing various types of data when the CPU 11 executes the program, and as an image memory for storing image data, and the like.

The nonvolatile memory 14 is a rewritable memory (flash memory) in which the stored contents are held even if the image forming apparatus 10 is turned off. In the nonvolatile memory 14, the unique information of the image forming apparatus 10, various types of setting information and the like are stored. In this embodiment, the area patterns which will be explained later, are registered.

The storing unit 15 comprises three HDDs (HDD1, HDD2 and HDD3) which are large-capacity nonvolatile storing devices. In this embodiment, any one of three HDDs is referred to as HDD. In the HDD, an OS program, various types of application programs, print data, image data, a job history, an incomplete setting history and the like are stored.

On the disk of the HDD, a plurality of tracks are provided as the storing area. The data transfer speed varies according to the tracks. In the tracks of the outer peripheral portion, the data transfer speed is high. In the tracks of the inner peripheral portion, the data transfer speed is low. Further, the track number is assigned to each track. The track number which is assigned to the track of the outermost periphery is 1. The track number which is assigned to each track increases by 1, such as 2, 3, 4, . . . , in order from the track of the outermost periphery to the track of the innermost periphery. In this embodiment, the track number which is assigned to the track of the innermost periphery is R.

In this embodiment, a plurality of tracks are sectionalized into three areas which are the outer peripheral portion, the middle portion and the inner peripheral portion. The data is written in the tracks of one of the areas. That is, the storing area of each HDD is sectionalized into a plurality of areas along the circumferential direction of the storing area. When the data is written in the HDD, the CPU 11 designates the position (sector) to which the data is written.

The display unit 16 is configured by a liquid crystal display (LCD) and the like, and has a function of displaying various types of operation windows, setting windows, and the like. The operating unit 17 has a function of receiving various types of operations, such as the entry and the setting of a job, from a user. The operating unit 17 comprises a numerical keypad, character entry keys, a start button for starting the printing, and the like, in addition to a touch panel which is provided on the screen of the display unit 16 and which detects the coordinate position on which the touch panel is pushed.

The network I/F unit 18 communicates with another external device which is connected via a network, such as a LAN (Local Area Network) or the like.

The scanner unit 19 has a function of optically reading an original to obtain the image data. Further, the scanner unit 19 comprises a light source for irradiating an original with light, a line image sensor for reading the original line by line in the width direction of the original by receiving the reflected light from the original, a moving unit for sequentially moving the reading position line by line in the longitudinal direction of the original, an optical system having lenses, mirrors and the like for guiding the reflected light from the original to the line image sensor and focusing the reflected light on the line image sensor, a converting unit for converting an analog image signal outputted from the line sensor image into digital image data, and the like.

The image processing unit 20 carries out the rasterization processing for converting print data into image data, the compression/decompression processing for image data and the like, in addition to the processings, such as enlargement/reduction and rotation of the image.

The print unit 21 has a function as the image forming unit for forming an image on the recording paper based on print data. In this embodiment, the print unit 21 is configured as a so-called laser printer (printer engine) which comprises a conveying device for the recording paper, a photoconductive drum, a charging device, a laser unit, a developing device, a transfer and separation device, a cleaning device and a fixing device, and which forms an image by the electrophotographic process. Alternatively, an image may be formed by an inkjet type of printer or another type of printer. In this embodiment, the printer unit 21 forms an image in accordance with the division data which are read from the storing unit 15.

The facsimile communication unit 22 controls the operations relating to the facsimile transmission and reception.

In the image forming apparatus 10 according to the embodiment, the CPU 11 divides the data to be written into three unequal division data, as the data division unit. Further, the CPU 11 dispersedly storing the division data in three HDDs in parallel as the writing control unit. When the division data are dispersedly stored, the division data having the largest data size among three division data is written in the tracks of the outer peripheral portion in which the data transfer speed is high. The division data having the second largest data size is written in the tracks of the middle portion in which the data transfer speed is middle. The division data having the smallest data size is written in the tracks of the inner peripheral portion in which the data transfer speed is low. Thereby, the writing time for writing the division data in each HDD is averaged. Because the tracks of the outer peripheral portion compensate for the lack of the data transfer speed in the tracks of the inner peripheral portion, which is necessary to maintain the productivity in the image forming apparatus 10, the data transfer speed of the storing unit 15 (three HDDs) can be not less than the speed which is necessary for the image forming apparatus 10 to maintain the productivity. Further, by changing the HDD for storing each division data by rotation, it is possible to efficiently use the storing area of each HDD.

Figure 2:
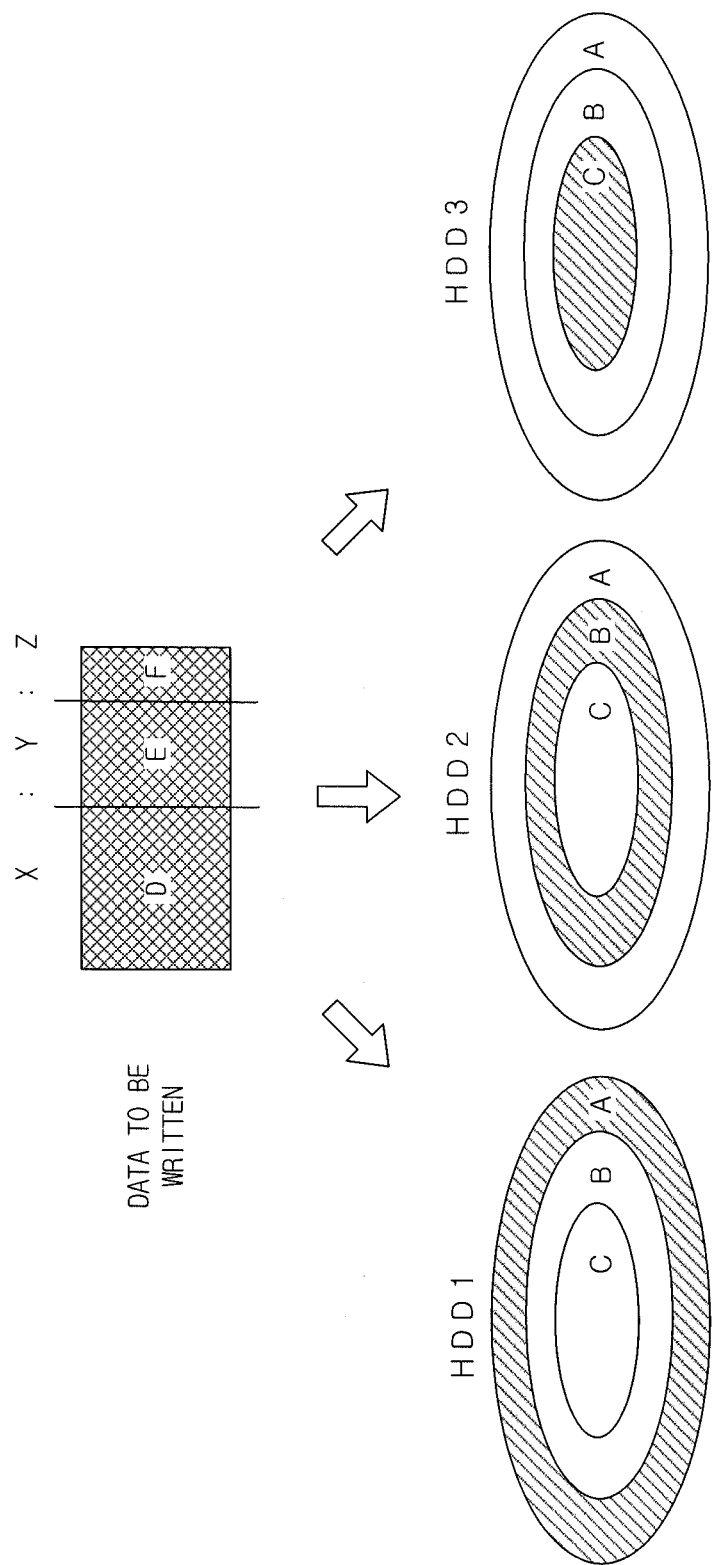
FIG. 2 is an explanatory view showing the situation in which the image forming apparatus dispersedly stores the division data in the HDDs.

FIG. 2 shows an example of the situation in which the image forming apparatus 10 according to the embodiment dispersedly stores the division data. Firstly, in the image forming apparatus 10, the storing area of each HDD is previously sectionalized into three areas by using the tracks as the borders, that is, along the circumferential direction of the storing area of the HDD. The outer peripheral portion is referred to as the area A. The middle portion is referred to as the area B. The inner peripheral portion is referred to as the area C. In this embodiment, the size of each area is determined so as to satisfy the inequality: area A>area B>area C.

Next, when the instruction for storing the data is received, the CPU 11 divides the data to be written into three division data in the ratio X:Y:Z (X>Y>Z). The division data having the size ratio of X/(X+Y+Z) is referred to as the division data D. The division data having the size ratio of Y/(X+Y+Z) is referred to as the division data E. The division data having the size ratio of Z/(X+Y+Z) is referred to as the division data F. In FIG. 2, the CPU 11 dispersedly stores the division data D in the HDD1, the division data E in the HDD2 and the division data F in the HDD3, respectively.

When the CPU 11 dispersedly stores the division data, the CPU 11 stores the division data in different areas, respectively. In case that the data transfer speeds are compared in the respective areas, the data transfer speed in the area A which is the outer peripheral portion is the highest, and the data transfer speed in the area C which is the inner peripheral portion is the lowest. Therefore, when the CPU 11 dispersedly stores the division data, the CPU 11 writes the division data D having the largest data size in the area A, the division data E having the second largest data size in the area B, and the division data F having the smallest data size in the area F. That is, the CPU 11 writes the division data D having a larger data size than the division data E in the tracks of the portion which is positioned on an outer side than the portion in which the division data E is written, and the division data E having a larger data size than the division data F in the tracks of the portion which is positioned on an outer side than the portion in which the division data F is written. Thereby, the time which is necessary to write the division data in each HDD is averaged.

In this embodiment, when the CPU 11 writes the division data in each area, the division data is written in order from the outer side to the inner side in each area. However, the division data may be written in another order. For example, the division data may be written in order from the inner side to the outer side in each area.

Then, the CPU 11 continues to dispersedly store the division data in three HDDs. In case that any one of three areas in which the division data are written (in FIG. 2, the area A of the HDD1, the area B of the HDD2 and the area C of the HDD3) is full, that is, in case that there is no free space in any one area, the CPU 11 switches the HDD for storing each division data (changes the HDD by rotation). Because the area for writing the division data is changed in each HDD, the storing area of the HDD is efficiently used by repeating the above switching.

The method for switching the HDD for storing the division data (changing the HDD by rotation) will be explained. The image forming apparatus 10 previously registers a plurality of patterns (combinations) indicating the area to be used in each HDD, as the area patterns. The CPU 11 writes the corresponding division data in the area which is indicated by the area pattern.

Figure 3:
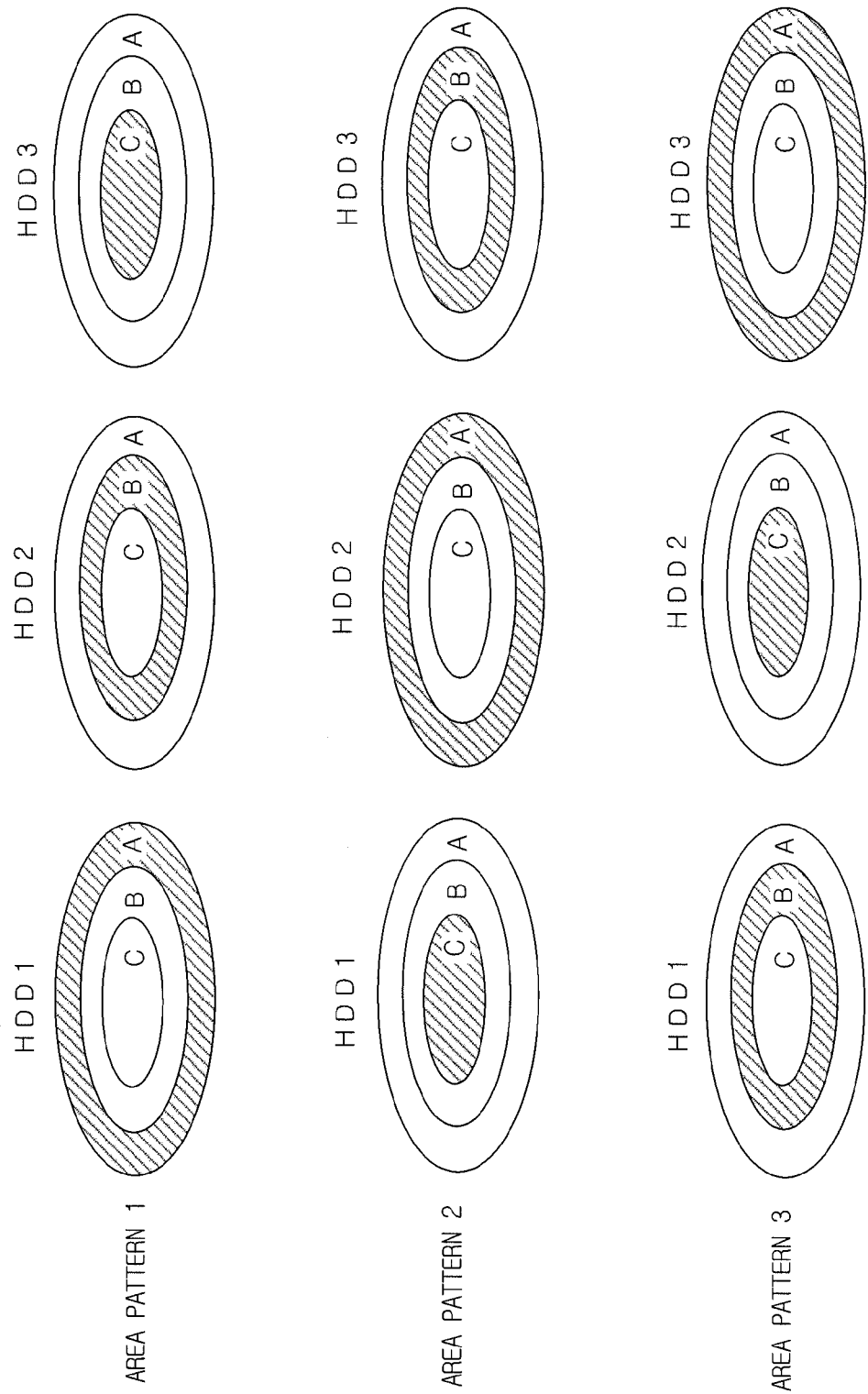
FIG. 3 is an explanatory view showing examples of area patterns.

FIG. 3 shows examples of the area patterns. The area pattern 1 is the pattern in which the area A of the HDD1, the area B of the HDD2 and the area C of the HDD3 are used as shown in FIG. 2. The area pattern 2 is the pattern in which the area C of the HDD1, the area A of the HDD2 and the area B of the HDD3 are used. The area pattern 3 is the pattern in which the area B of the HDD1, the area C of the HDD2 and the area A of the HDD3 are used. In any of the area patterns, all of three types of areas are combined.

Figure 4:
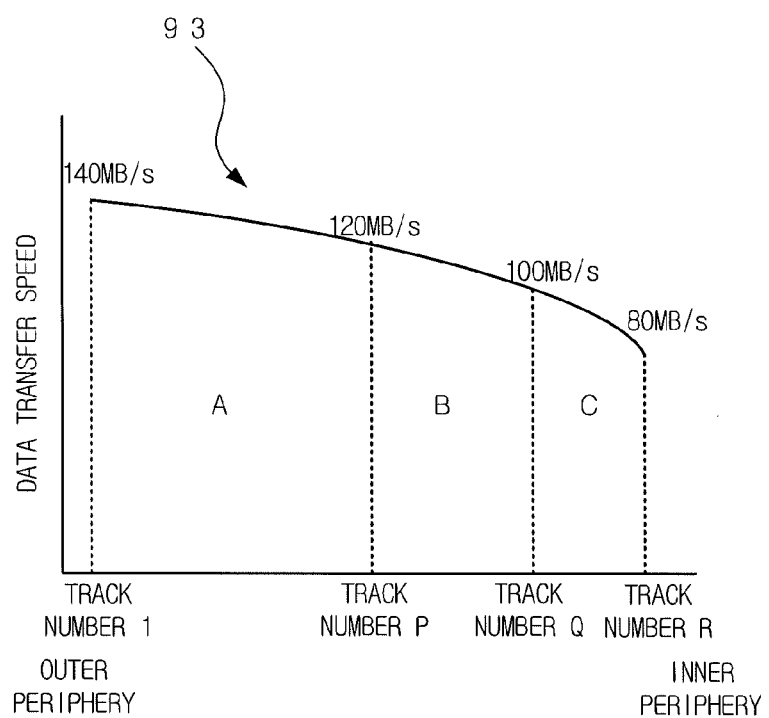
FIG. 4 is a view showing the relation between the track number and the data transfer speed in case that one HDD is used.

Next, the data transfer speed in each area will be explained. The graph 93 of FIG. 4 shows the relation between the position (track number) to which the data is written in the HDD and the data transfer speed. In the graph 93, the ordinate axis indicates the data transfer speed and the abscissa axis indicates the writing position (track number). As the track number increases (the writing position proceeds to the inner side), the data transfer speed becomes low. For example, the data transfer speed in the track having the track number of 1 (the outermost track) is 140 MB/s. On the other hand, the data transfer speed in the track having the track number of R (the innermost track) is 80 MB/s. The storing area from the track having the track number of 1 to the track having the track number of P is the area A. The storing area from the track having the track number of P to the track having the track number of Q is the area B. The storing area from the track having the track number of Q to the track having the track number of R is the area C.

In FIG. 4, in case that the data is written or read in the area A, the lowest data transfer speed is 120 MB/s. In case that the data is written or read in the area B, the lowest data transfer speed is 100 MB/s. In case that the data is written or read in the area C, the lowest data transfer speed is 80 MB/s. The CPU 11 roughly estimates the time which is necessary to write the division data in each HDD, by dividing the data size of the division data to be written by the lowest data transfer speed in the area in which the division data is written. Because the time which is necessary to transfer the data (the time which is necessary to write the division data) is roughly estimated by using the lowest data transfer speed in each area, the actual writing time is not longer than the time calculated by the above rough estimation.

After the lowest data transfer speed in each area is obtained in accordance with the actual measurement values, the data indicating the data transfer speed in each track and the like, the ratio X:Y:Z (See FIG. 2) is determined. The ratio X:Y:Z is determined so as to achieve the performance which is necessary for the image forming apparatus 10 to maintain the productivity when three division data are written.

For example, in case that the image forming apparatus 10 executes a print job (PC print job) received from an external PC (Personal Computer) terminal, the productivity maintaining speed of the image forming apparatus 10 is required, that is, it is necessary to carry out the print at the maximum print speed according to the specification of the image forming apparatus 10.

In accordance with the PC print job, the image forming apparatus 10 prepares image data by expanding the received print data. While the image forming apparatus 10 carries out the process for sequentially storing the image data in the HDD, the image forming apparatus 10 reads the image data for each page, which is obtained by the above expansion, from the HDD in order to store the image data in the page memory. At the timing of storing the image data for each page in the page memory, the CPU 11 instructs the printer unit 21 to print the image data which is stored in the page memory. Therefore, in case that the time which is necessary to transfer the data is long (the data transfer speed is low) when the image data obtained by the above expansion is transferred to the HDD or when the image data is read from the HDD to store the image data in the page memory, the printer unit 21 waits for the printing. As a result, the productivity in the image forming apparatus 10 is deteriorated.

In order for the image forming apparatus 10 to maintain the productivity, the ratio X:Y:Z is determined so that the maximum value of the time which is necessary to write each division data does not exceed the time (referred to as the limit time) calculated by dividing the data size of the data which has not been divided, by the productivity maintaining speed. For example, the limit time is the maximum value of the allowable time in which the printer unit 21 carries out the continuous printing.

Specifically, when the ratio X:Y:Z is determined so that the data size of each division data may not exceed the value obtained by multiplying the lowest data transfer speed in the area in which the division data is written, by the limit time (S), it is possible for the image forming apparatus 10 to maintain the productivity. For example, in FIG. 4, the lowest data transfer speeds in the area A, the area B and the area C are 120 MB/s, 100 MB/s and 80 MB/s, respectively. Therefore, the ratio X:Y:Z is determined so that:

the data size of the division data D is not more than the value obtained by multiplying 120 MB/s by the limit time (S);

the data size of the division data E is not more than the value obtained by multiplying 100 MB/s by the limit time (S); and the data size of the division data F is not more than the value obtained by multiplying 80 MB/s by the limit time (S).

Then, the CPU 11 divides the data to be written in the storing unit 15 in the determined ratio. That is, the CPU 11 which functions as the data division unit, divides the data so that the data size of the division data does not exceed the value obtained by multiplying the data transfer speed in the tracks in which the division data is written, by the predetermined time (limit time). In this embodiment, the CPU 11 repeatedly divides the data in the ratio determined as described above.

In case that the ratio X:Y:Z approximates the ratio of the lowest data transfer speed in each area (in FIG. 4, 120 MB/s, 100 MB/s and 80 MB/s), the difference in the time which is necessary to write the division data among three HDDs, becomes small.

In case that the ratio X:Y:Z is determined so as to fill up the area C the fastest among three areas, after the area patterns (See FIG. 3) are changed by rotation (after the areas C of all of the HDDs are full), the free space remains in each of the area A and the area B. In this case, by using the free space in each of the area A and the area B to carry out the RAID 0 (striping), it is possible to use all of the storing areas.

Figure 5:
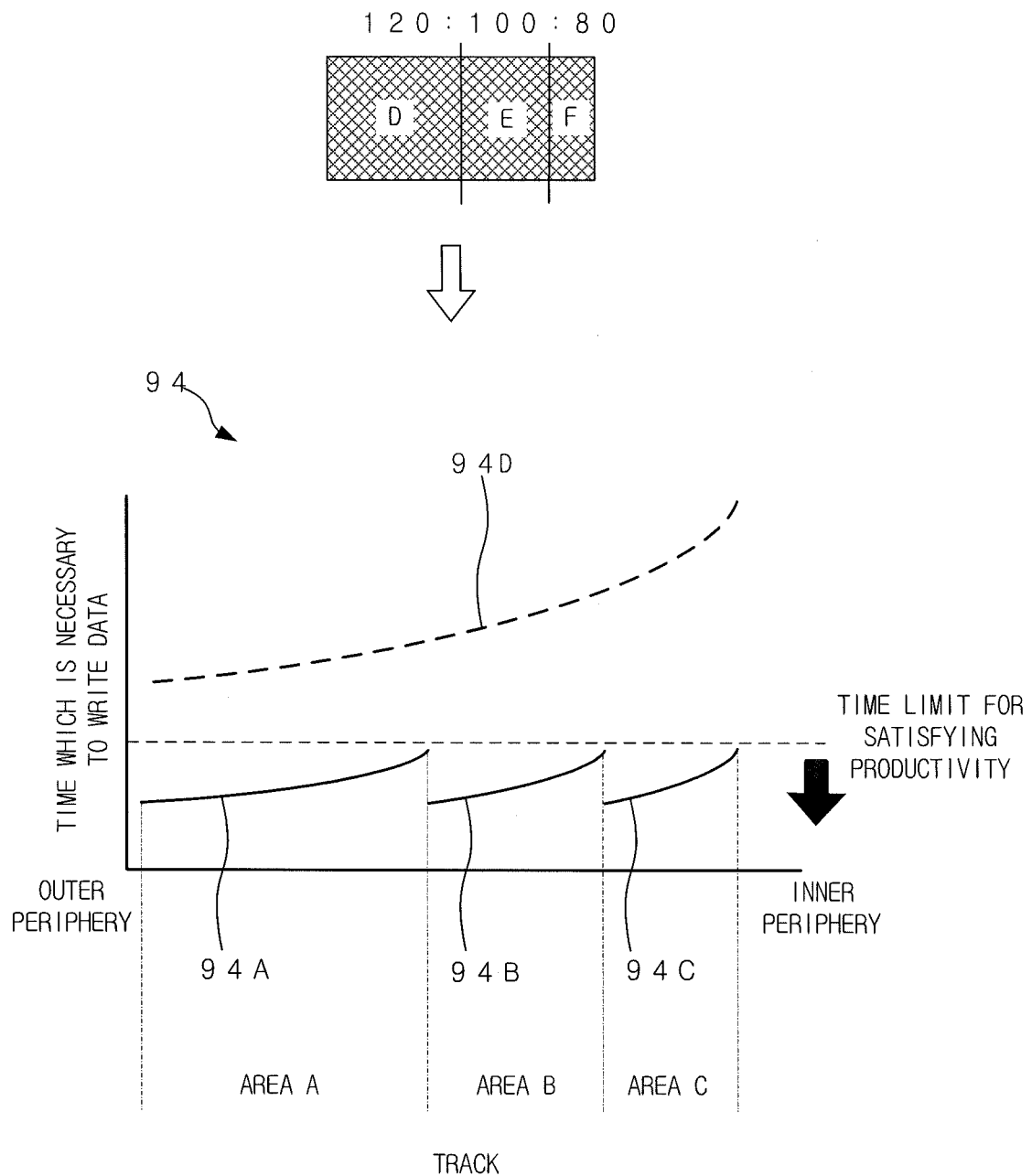
FIG. 5 is a view showing the relation between the track number indicating the position to which the division data is written in each HDD and the time which is necessary to write the division data, in case that the image forming apparatus dispersedly stores the division data.

The graph 94 of FIG. 5 shows the relation between the position (track) to which each division data (division data D, E and F) is written and the time which is necessary to write each division data, in case that the ratio X:Y:Z is the same as the ratio of the lowest data transfer speed in each area shown in FIG. 4 (120:100:80). In this case, the CPU 11 which functions as the data division unit, divides the data in the ratio of each data size of three division data, which is determined so as to be coincident with the ratio of the data transfer speed in the tracks in which each division data is written. In the graph 94, the abscissa axis indicates the track and the ordinate axis indicates the time which is necessary to write each division data.

The curve line 94A indicates the relation between the position to which the division data D is written in the HDD1 (area A) and the time which is necessary to write the division data D. The curve line 94B indicates the relation between the position to which the division data E is written in the HDD2 (area B) and the time which is necessary to write the division data E. The curve line 94C indicates the relation between the position to which the division data F is written in the HDD3 (area C) and the time which is necessary to write the division data F. The curve line 94D indicates the relation between the position to which the data is written and the time which is necessary to write the data, in case that the data is written in one HDD prior to the division of the data.

Because the division data are written in three HDDs in parallel, the time which is necessary to write the data becomes short as compared with the case in which the data is written in one HDD. The performance which is necessary for the image forming apparatus 10 to maintain the productivity is achieved. Further, because the ratio X:Y:Z is coincident with the ratio of the lowest data transfer speed in each area, the time which is necessary to write the division data in one of three HDDs, is substantially the same as the time which is necessary to write the division data in the other two of the HDDs.

Next, the method for sectionalizing the tracks of the HDD into a plurality of areas (area A, area B and area C) is explained. In case that the tracks are sectionalized into three areas, the areas are determined so that the sum of the lowest data transfer speeds in the respective areas is not less than the productivity maintaining speed of the image forming apparatus 10. In this embodiment, the size of each area is determined so as to satisfy the inequality: area A>area B>area C. After the tracks are sectionalized, the ratio of the size of the division data (the ratio for maintaining the productivity in the image forming apparatus 10) is determined and stored.

In case that the ratio X:Y:Z is fixed to the ratio of each size of three areas (area A:area B:area C), the free space in which the division data is written is filled at the same timing in each HDD. Therefore, by changing the area patterns by rotation (See FIG. 3), it is possible to efficiently use the whole storing area of the HDD.

Figure 6:
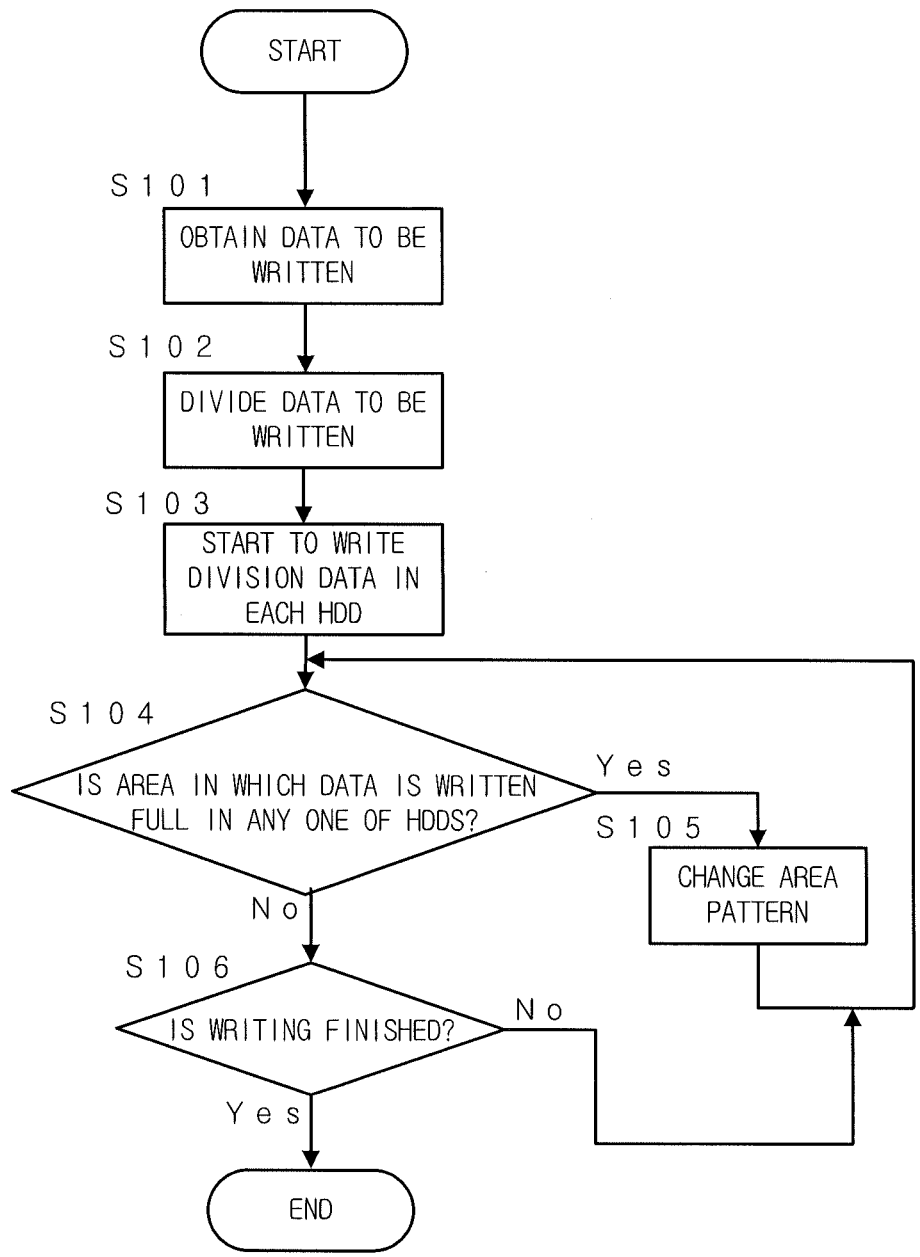
FIG. 6 is a flowchart showing the process which is carried out when the image forming apparatus dispersedly stores the division data.
Figure 8:
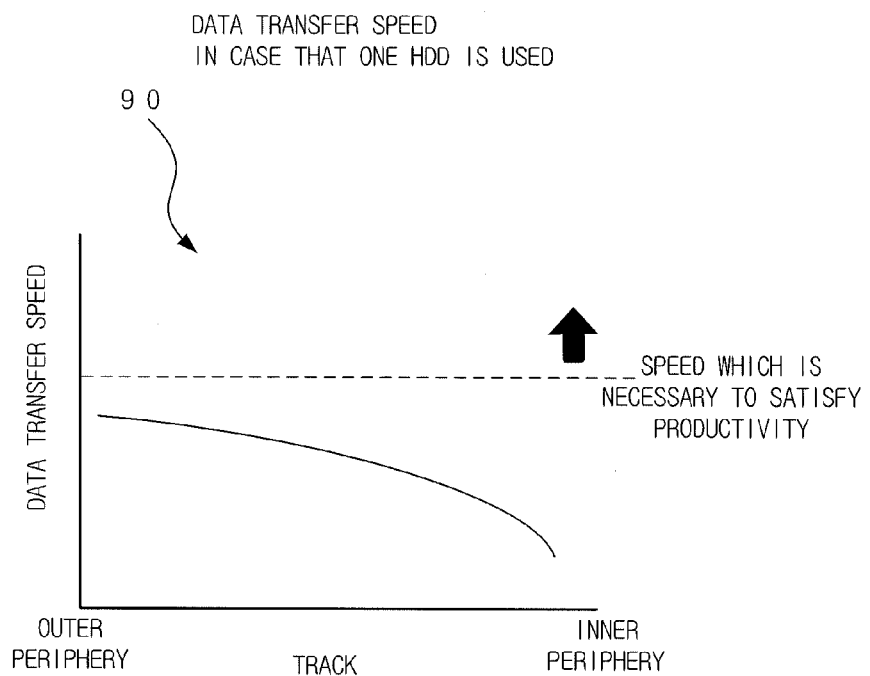
FIG. 8 is a view showing the relation between the position to which the data is written and the data transfer speed, in case that one HDD is used.
Figure 9:
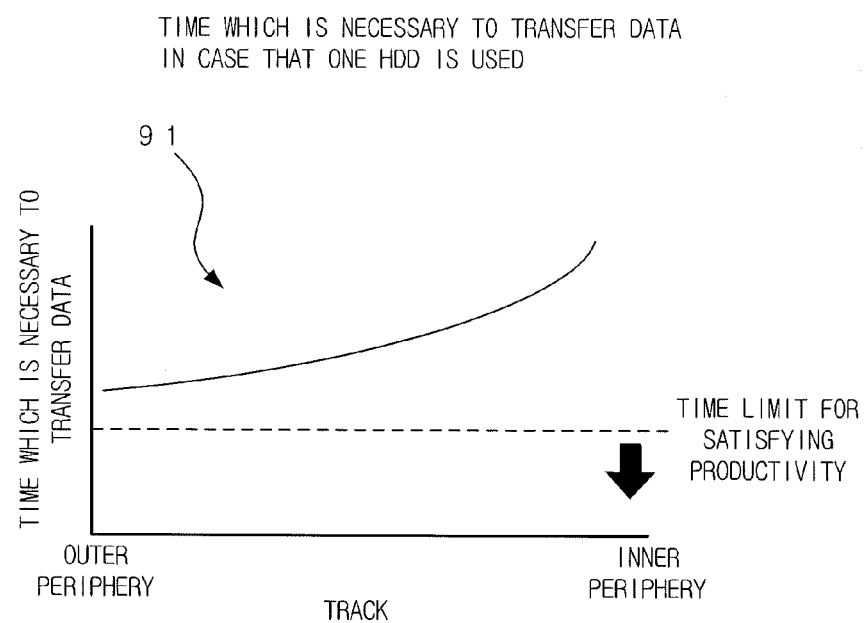
FIG. 9 is a view showing the relation between the position to which the data is written and the time which is necessary to transfer the data, in case that one HDD is used.
Figure 10:
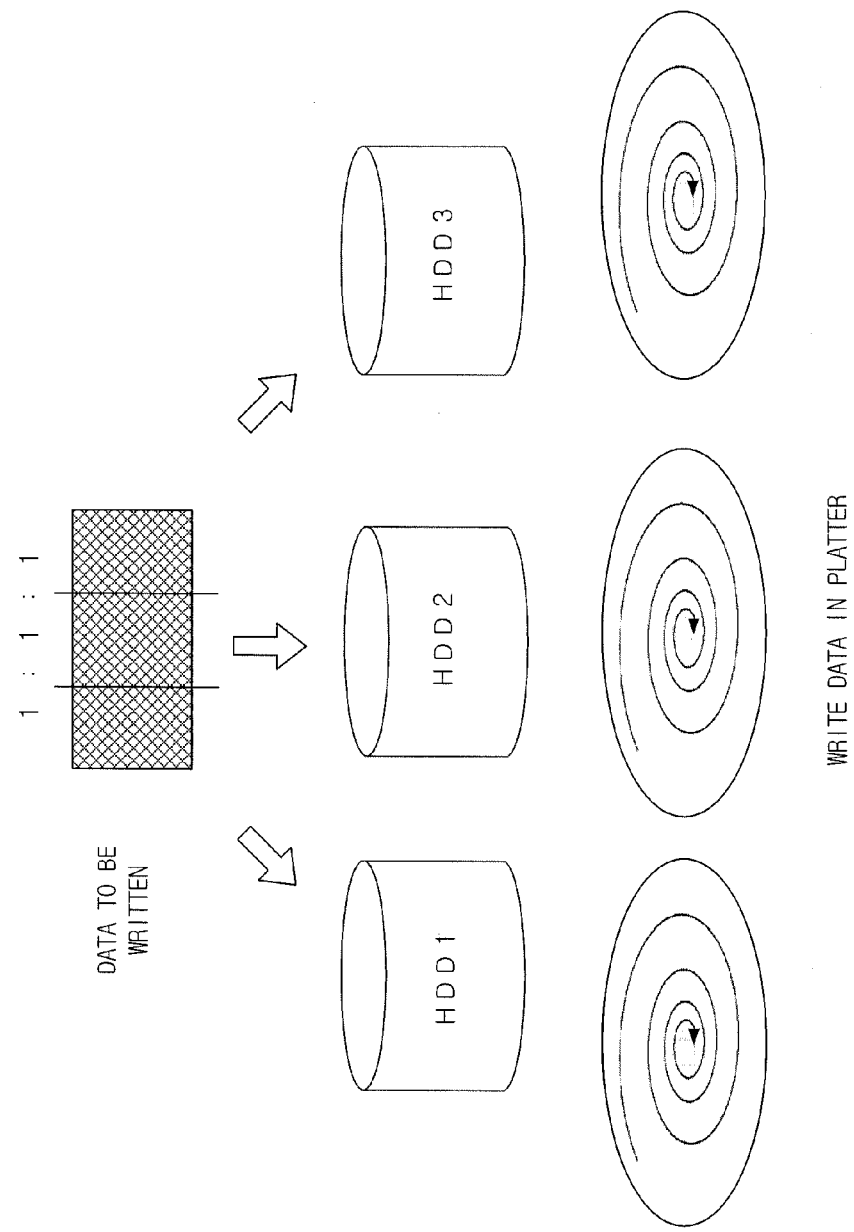
FIG. 10 is a view showing the situation in which the data is written by the striping in three HDDs.
Figure 11:
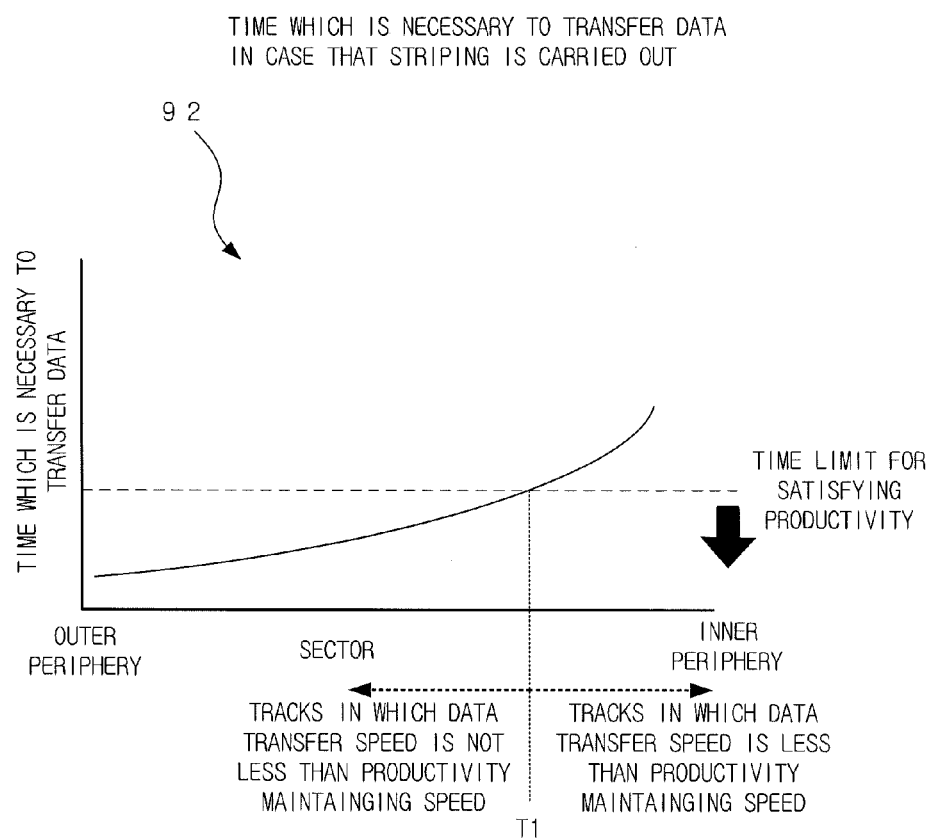
FIG. 11 is a view showing the relation between the position to which the data is written and the time which is necessary to transfer the data, in case that the data is written by the striping in three HDDs.

FIG. 6 shows the flowchart of the process for writing the data in the HDD. Firstly, the storing area of each HDD is previously sectionalized into three areas, and the ratio in which the data to be written is divided (the ratio X:Y:Z (See FIG. 2)) is determined. When the instruction for writing the data is received, the image forming apparatus 10 obtains the data to be written (Step S101).

Next, the CPU 11 divides the data to be written, into the three division data in the predetermined ratio (Step S102). Then, the CPU 11 starts to write the division data in each corresponding area of the storing unit 15 in accordance with the area pattern which is currently set (Step S103).

When the free space in the area in which the data is written is filled in any one of the HDDs (Step S104; Yes), the CPU 11 changes the area pattern from the current area pattern to another area pattern (Step S105). That is, the CPU 11 switches the HDD for writing each division data and continues the process by returning to Step S104.

When the writing of the division data is finished (Step S106; Yes) before the free space in the area in which the data is written is not filled in any one of the HDDs (Step S104; No), the process is ended. Until the writing of the division data is finished (Step S106; No), the CPU 11 continues the process by returning to Step S104.

In case that there is no free space in any one of the areas regardless of using all of the registered area patterns, the CPU 11 notifies the user that any one of the areas is full. When the user secures the free space by deleting unnecessary data or by exchanging the HDD for a new one, the CPU 11 continues the above process. In case that there is free space in the areas except the area C, the RAID 0 (striping) may be carried out by using the above free space.

In this embodiment, the CPU 11 divides the data to be written, into three unequal division data, and dispersedly stores the division data in three HDDs in parallel. Because the CPU 11 writes the division data in three HDDs in parallel, it is possible to increase the data transfer speed of the whole storing unit 15. Further, when the CPU 11 dispersedly stores the division data, the CPU 11 writes the division data having the largest data size among three division data in the tracks of the outer peripheral portion (area A), writes the division data having the second largest data size in the tracks of the middle portion (area B), and writes the division data having the smallest data size in the tracks of the inner peripheral portion (area C). Thereby, the time which is necessary to write the division data in one HDD is averaged. Further, by switching the HDD for storing each division data (by changing the HDD by rotation), it is possible to effectively use the storing area of each HDD. Therefore, it is not necessary to increase a new HDD like the RAID 0 (striping) described in the Description of Related Art.

When the data to be written is divided, the CPU 11 divides the data in the ratio for maintaining the productivity in the image forming apparatus 10. In case that the ratio in which the data is divided (X:Y:Z) approximates the ratio of the lowest data transfer speed in each area, the time which is necessary to write the division data in each HDD is averaged. In case that the ratio in which the data is divided (X:Y:Z) is coincident with the ratio of the lowest data transfer speed in each area, the time which is necessary to write the data is the shortest. Further, in case that the ratio in which the data is divided (X:Y:Z) approximates the ratio of each size of the areas (area A:area B:area C), it is possible to efficiently use the storing area of the HDD.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

In this embodiment, the storing unit 15 of the image forming apparatus 10 comprises three HDDs. However, the number of the HDDs is not limited to three. The storing unit 15 may comprise two or more HDDs.

In this embodiment, the image forming apparatus 10 is explained as an example. The present invention may also relate to a writing control device comprising a plurality of HDDs (storing unit 15) and the CPU 11 for controlling the division of the data and the writing of the division data in the HDDs.

In this embodiment, the storing area of the HDD is sectionalized into three areas. The number of the areas is not limited to three and may be two or more. Further, it is not necessary that each size of three areas is determined so as to satisfy the inequality: area A>area B>area C. However, in case that the size of each area is determined so as to satisfy the inequality: area A>area B>area C, because the magnitude relation of the division data to be stored in the respective areas is the same as the magnitude relation of the sizes of the respective areas, it is possible to efficiently use the storing area of the HDD. Further, it is not necessary to sectionalize the storing area into a plurality of areas. For example, in case that two HDDs are provided, the data may be written in one HDD in order from the outer peripheral portion to the inner peripheral portion and the data may be written in the other HDD in order from the inner peripheral portion to the outer peripheral portion.

In this embodiment, the determined ratio in which the data is divided is repeatedly used. The ratio may be determined again every when the data is divided. For example, the relation between the track and the data transfer speed is previously grasped, and every when the data having the predetermined size is written, the ratio in which the data is divided may be determined again in accordance with the data transfer speed in the tracks in which the next data is written. Further, the ratio in which the data is divided is not limited to the ratio described in the embodiment. As long as the above ratio is one for maintaining the productivity in the image forming apparatus 10, the user may optionally set the ratio. The number of the division data into which the data is divided is not limited to three. As long as the number of the division data is two or more, the number of the division data may be less than the number of the HDDs.

One of the objects of the above embodiment is to provide a writing control device and an image forming apparatus in which the storing area of each HDD is efficiently used and the desired data transfer speed can be obtained in case that a plurality of HDDs are used.

In this embodiment, the data to be written is divided into N unequal division data and the division data are dispersedly stored in N HDDs in parallel. At this time, the writing control unit controls the writing of the division data so as to write the second division data having a larger data size than the first division data in the tracks of the portion which is positioned on an outer side than the portion in which the first division data is written. The division data having a large data size is stored in the tracks of the outer peripheral portion in which the data transfer speed is high, and the division data having a small data size is stored in the tracks of the inner peripheral portion in which the data transfer speed is low. Therefore, the time which is necessary to write the division data in each HDD is averaged.

In this embodiment, the writing control unit switches between the HDD in which the division data is written in the tracks of the outer peripheral portion and the HDD in which the division data is written in the tracks of the inner peripheral portion. Therefore, it is possible to efficiently use the storing area of the HDD.

In this embodiment, the storing area of the HDD is sectionalized into a plurality of areas along the circumferential direction of the storing area. Further, the writing control unit writes the second division data in the tracks of the area which is positioned on an outer side than the area in which the first division data is written.

In this embodiment, the data size of each division data is determined so as not to exceed the value obtained by multiplying the data transfer speed in the tracks in which the division data is written, by the predetermined time.

In this embodiment, the ratio in which the data to be written is divided is determined so as to be coincident with the ratio of the data transfer speed in the tracks in which each division data is written. Thereby, it is possible to write the data at the highest speed.

In this embodiment, the data size of each division data is determined so as not to exceed the value obtained by multiplying the data transfer speed in the tracks in which the division data is written, by the predetermined time. The predetermined time is the maximum value of the allowable time in which the image forming unit carries out the continuous printing. Thereby, the image forming apparatus can maintain the productivity.

According to the writing control device and the image forming apparatus, it is possible to efficiently use the storing area of each HDD and to obtain the desired data transfer speed in case that a plurality of HDDs are used.

The present U.S. patent application claims the priority of Japanese Patent Application No. 2013-14839, filed on Jan. 29, 2013, according to the Paris Convention, and the entirety of which is incorporated herein by reference for correction of incorrect translation.

What is claimed is:

1. A writing control device, comprising:
a storing unit comprising N hard disk drives, N being an integer which is 2 or more;
a data division unit that divides data to be written in the storing unit into N unequal division data; and
a writing control unit that dispersedly stores the N division data in the N hard disk drives in parallel,
wherein the N division data include a first division data and a second division data having a larger data size than the first division data, and the writing control unit writes the second division data in tracks of a portion of the hard disk drive, which is positioned on an outer side than a portion in which the first division data is written.

2. The writing control device of claim 1, wherein the writing control unit switches between the hard disk drive in which the first division data is written and the hard disk drive in which the second division data is written.

3. The writing control device of claim 1, wherein a storing area of each hard disk drive is sectionalized into a plurality of areas along a circumferential direction of the storing area, and the writing control unit writes the second division data in the tracks of the area which is positioned on an outer side than the area in which the first division data is written.

4. The writing control device of claim 1, wherein the data division unit divides the data so that a data size of each division data does not exceed a value obtained by multiplying a data transfer speed in tracks in which the division data is written, by a predetermined time.

5. The writing control device of claim 1, wherein the data division unit divides the data in a ratio of each data size of the N division data, which is determined so as to be coincident with a ratio of a data transfer speed in tracks in which each division data is written.

6. An image forming apparatus, comprising:
    the writing control device of claim 1; and
    an image forming unit that forms an image in accordance with the division data which are read from the storing unit,
    wherein the data division unit divides the data so that a data size of each division data does not exceed a value obtained by multiplying a data transfer speed in tracks in which the division data is written, by a predetermined time, and the predetermined time is a maximum value of allowable time in which the image forming unit carries out continuous printing.

7. The image forming apparatus of claim 6, wherein the data division unit divides the data in a ratio of each data size of the N division data, which is determined so as to be coincident with a ratio of a data transfer speed in tracks in which each division data is written.

* * * * *